United States Patent [19]
Yasui

[11] Patent Number: 5,806,230
[45] Date of Patent: *Sep. 15, 1998

[54] FISHING ROD AND GUIDE ELEMENT FOR SAME

[75] Inventor: Toshihiko Yasui, Tondabayashi, Japan

[73] Assignee: Shimano Inc., Sakai, Japan

[ * ] Notice: The term of this patent shall not extend beyond the expiration date of Pat. No. 5,528,848.

[21] Appl. No.: 699,214

[22] Filed: Aug. 19, 1996

Related U.S. Application Data

[63] Continuation of Ser. No. 363,043, Dec. 23, 1994, abandoned.

[30] Foreign Application Priority Data

Mar. 25, 1994 [JP] Japan .................................. 6-055448
Mar. 28, 1994 [JP] Japan .................................. 6-056915

[51] Int. Cl.⁶ .................................................. A01K 87/00
[52] U.S. Cl. ........................................................ 43/24
[58] Field of Search ................................... 43/18.1, 24

[56] References Cited

U.S. PATENT DOCUMENTS

| | | | |
|---|---|---|---|
| 1,595,275 | 8/1926 | White ............................................ | 43/24 |
| 2,282,618 | 5/1942 | Stewart ........................................ | 43/18.1 |
| 2,334,646 | 11/1943 | Price ............................................ | 43/24 |
| 2,541,609 | 2/1951 | Pullan .......................................... | 43/18.1 |
| 2,578,663 | 12/1951 | Beaupre ....................................... | 43/18.1 |
| 2,729,012 | 1/1956 | Lee . | |
| 2,776,516 | 1/1957 | Jennette ....................................... | 43/24 |
| 2,777,239 | 1/1957 | Cushman . | |
| 3,789,533 | 2/1974 | Bowerfind ................................... | 43/18.1 |
| 3,862,509 | 1/1975 | Petersen, Jr. ................................ | 43/24 |
| 4,020,581 | 5/1977 | Genovese .................................... | 43/24 |
| 4,130,960 | 12/1978 | Fontenot . | |
| 4,183,163 | 1/1980 | Reimer ........................................ | 43/24 |
| 4,212,126 | 7/1980 | Barnett ........................................ | 43/24 |
| 5,456,038 | 10/1995 | Park ............................................ | 43/24 |
| 5,528,848 | 6/1996 | Myojo et al. ............................... | 43/24 |
| 5,575,103 | 11/1996 | Hare ............................................ | 43/24 |
| 5,704,157 | 1/1998 | Utsuno et al. .............................. | 43/24 |

FOREIGN PATENT DOCUMENTS

| | | | |
|---|---|---|---|
| 2467546 | 5/1981 | France ........................................ | 43/24 |
| 1159069 | 7/1969 | United Kingdom . | |
| 1259820 | 1/1972 | United Kingdom ....................... | 43/24 |

*Primary Examiner*—Kurt Rowan
*Attorney, Agent, or Firm*—Shinjyu An Intellectual Property Firm

[57] ABSTRACT

A fishing rod comprises a tubular tip section having an inner passage bore through a longitudinal center to opened at both a first end and a second end; a butt section is provided at a second end of the tip section, having a butt grip and a reel seat and a guide element provided intermediate the tip section and the butt section, having an inner bore opening at the first end thereof coupling with the second end of the tip section, and a guide hole section formed with a hole penetrating through an outer wall proximate the tip section second end over an area of the inner bore having a width larger than the inner diameter of said inner passage.

15 Claims, 11 Drawing Sheets

FISHING ROD AND GUIDE ELEMENT FOR SAME

This application is a file wrapper continuation of application Ser. No. 08/363,043, filed Dec. 23, 1994 (abandoned).

BACKGROUND OF THE INVENTION

1. Field of the Invention

The present invention relates to a hollow fishing rod, in which a fishline passes through a hollow extent of the rod interior, and more particularly, it relates to a guide element, the guide element having a guide hole for guiding fishline from a reel attached to the rod, to the interior of the rod and a drain hole for expelling seaweed and other undesirable things such as water out from the interior of the rod.

2. Description of the Related Art

Hollow fishing rods having an interior passage for guiding fishline therethrough are well-known. Such fishing rods have had guide holes provided therein for guiding fishline unwound from a reel to the inside of the rod. For example, Japanese Unexamined Patent Publication No. 248945/1992 discloses a hole in a position extending to the inside of the rod, and it also has a guide attached for guiding the line into the hole. The guide has a tubular element for containedly guiding and passing the fishline.

The hole of the prior art fishing rod as mentioned above cannot be larger in diameter than the inner passage of the rod. Should the hole be larger, the line comes in contact with the tubular element in the area of the hole, and this, in turn, results in a large amount of friction being placed on the fishline when it passes this part of the rod.

When winding the fishline up on the reel, seawater and other things are brought into the inner passage via the line passing through it. The seawater and other things remaining in the rod have salt and other components which upon crystallization yet increase the frictional resistance on the line as it contacts the hole. In order to overcome this disadvantage, for example, Japanese Unexamined Utility Model Publication No. 3072/1994 discloses a device in which behind a guide element for guiding fishline from a reel into the inside of a rod there is provided a bank to block seawater and other undesirable things entering the inside of the rod, and a drain hole to expel the seawater out of the rod.

However, the drain hole formed in the prior art fishing rod is smaller in diameter than the inner fishline passage, and hence, seaweed, dust and other undesirable things brought inside the rod via the line are often hard to expel through the drain hole.

SUMMARY OF THE INVENTION

It is an object of the present invention to keep the fishline off a guide hole to reduce friction caused on the fishline sliding through it such that the fishline can be smoothly wound and unwound to and from a reel.

It is another object of the present invention to expel undesirable things like seaweed as well as water out from the inside a rod.

In an aspect of the present invention, a fishing rod includes a tubular tip section, a butt section, and a fishline guide element. The tip section has an inner passage defined therein through which fishline is to extend. The butt section has a butt grip and a reel seat and is provided behind the tip section. The guide element is disposed intermediate the tip section and the butt section, having a inner bore in its first end for interconnection with the tip section and a guide hole of larger width than an inner diameter of the tip section inner passage. The guide hole extends through the outer wall of the guide element proximate the opening into the tip section inner passage, and is for guiding a fishline from a reel mounted on the reel seat into the inner passage.

In accordance with the present invention, the guide hole can be made without restricting or hindering the fishline as it passes through the inner passage of the rod, and frictional resistance on the line at the guide hole can be reduced without reducing the strength of the rod.

In another aspect of the present invention, a fishing rod includes a tubular tip section, a butt section, and a guide element. The tip section of the rod has an inner passage through which fishline is to extend through. The butt section of the rod is disposed behind the tip section and has an a butt grip and reel seat. The guide element is provided intermediate the tip section and the butt section, and is provide with an inner bore in its first end for interconnection of the tip section, a guide hole for guiding fishline from a reel mounted on the reel seat into the inner passage of the tip section, and a drain hole for opening the lower portion of the rod to the outside. The guide hole is formed with a width larger than an inner diameter of inner passage of the tip section, and the drain hole is of a larger diameter than a minimum diameter of the inner passage. Water, dust and the like brought into the rod with the line, through the inner passage to the guide element, are discharged out the guide element drain hole.

Here also, in accordance with the present invention, the guide hole and the drain hole can be made without restricting or hindering the fishline as it passes through the inner passage of the rod. Furthermore, frictional resistance on the line at the guide hole can be reduced and undesirable matter may be expelled from the rod without reducing the strength of the rod.

DESCRIPTION OF THE PREFERRED EMBODIMENT

Figure 1:
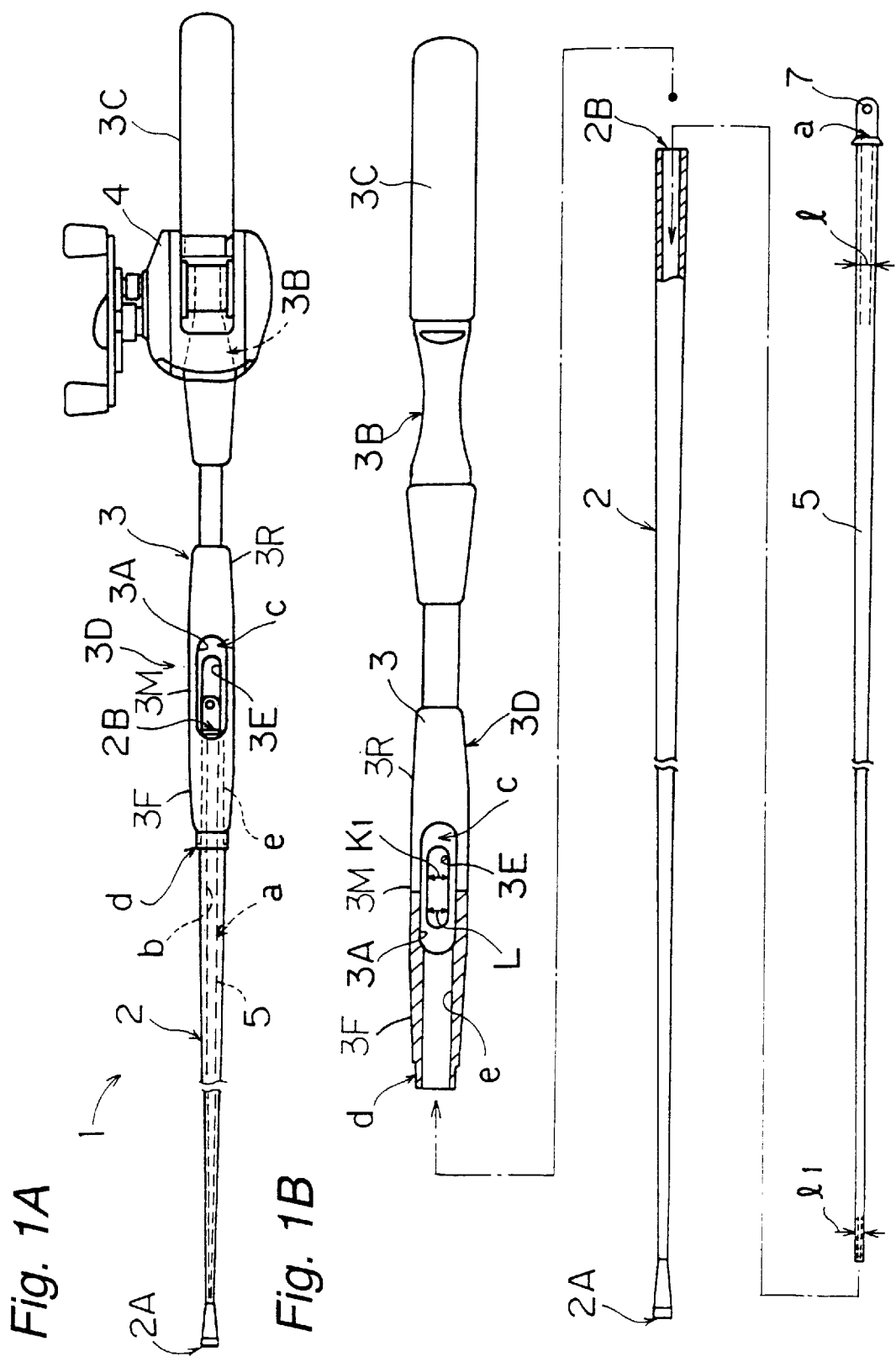
FIG. 1A is a top elevation of a fishing rod having a guide element, showing an interior passage within the rod in phantom, in a preferred embodiment of the present invention.
FIG. 1B is an exploded, fragmentary, part elevation, part section view of the rod depicted in FIG. 1A with a tip section of the rod shown removed from a butt section of the rod, and an inner rod shown removed from the tip section.
Figure 3:
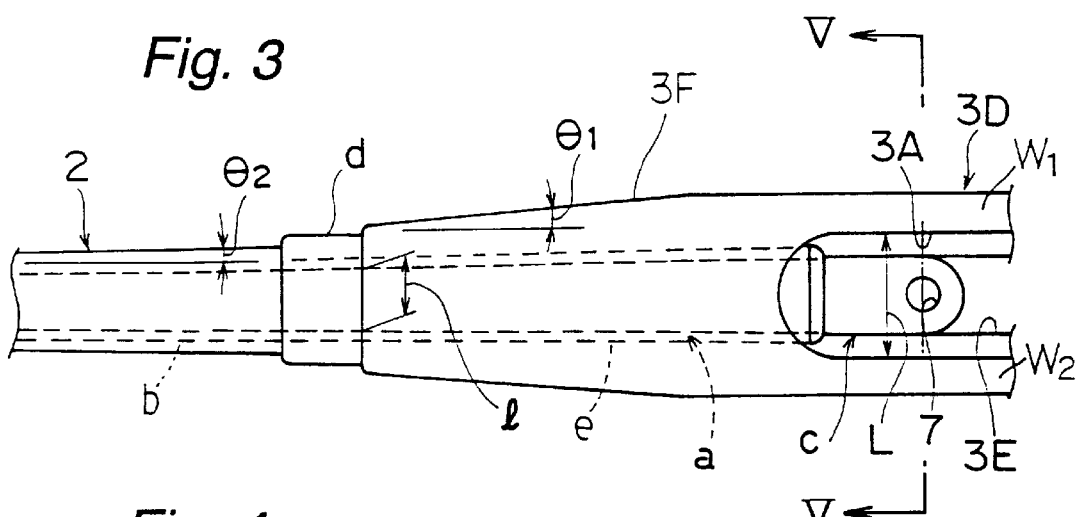
FIG. 3 is a fragmentary top view of a portion of the rod depicted in FIG. 1, shown on a slightly enlarged scale.
Figure 4:
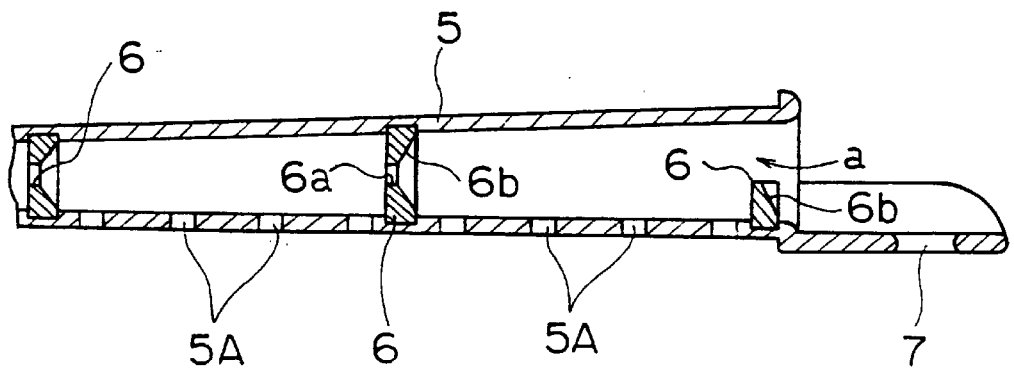
FIG. 4 is a fragmentary enlarged section of a portion of the inner rod depicted in FIG. 2.

These and other objects, features, aspects and advantages of the present invention will become more fully apparent from the following detailed description of the present invention when taken in conjunction with the accompanying drawings where like reference numerals denote corresponding parts throughout, in which a fishing rod 1, in accordance with a first embodiment of the present invention, is shown in FIG. 1A. The lure rod 1 has a tip section 2 and a butt section 3, where the sections 2 and 3 are interconnectable and may be disconnected from one another, as is shown in FIG. 1B. The tip section 2 is tube shaped having a tapered inner bore (b) defined between a first end opening 2A and a second end opening 2B (FIG. 1B). The tip section 2 has a gradually tapered portion on the tip of its first end adjacent to the opening 2A and a rear portion adjacent to the opening 2B tapered at taper angle of $\theta_2$ (FIG. 3). A tapered inner rod 5 is insertable into the second end opening 2B into the inner passage (b) of the tip section 2. Inside the inner rod 5, an inner passage (a) is defined through which fishline may extend.

The butt section 3 has a butt grip 3C and a reel seat 3B provided on the front portion of the butt grip 3C. A guide element 3D on the first end of the butt section 3, is formed wider in diameter than its immediately proximate rod sections. The guide element 3D may be formed integrally with the butt section 3 or may be a removable element, as is described in a application Ser. No. 08/363,077 now U.S. Pat. No. 5,528,848 entitled "COUPLING SLEEVE FOR A FISHING ROD" filed on the same day herewith and assigned to a common assignee.

As can be seen in FIGS. 1A and 1B, the guide element 3D includes a mid-section 3M formed with a guide hole 3A, a first side tapered portion 3F with a taper angle $\theta_1$ (see FIG. 3), a back side tapered portion 3R, an inner bore (e) which extends from the first side tapered portion 3F to the guide hole 3A. As is apparent from FIG. 1A, the second end of the tip section 2 adjacent to the opening 2B extends through the inner bore (e) of the guide element 3D and partially extends into the guide hole 3A when the rod 1 is fully assembled. Hence, the inner passage (a) is open to the guide hole 3A.

Referring to FIG. 3, the taper angle $\theta_1$ of the first side tapered portion of the guide element 3D is larger than the taper angle $\theta_2$ the tip section 2. The guide hole 3A is for guiding a fishline into the inner passage (a) of the inner rod 5. A step portion (d) is formed at the end of the front side tapered portion of guide element 3D. The width of the guide element 3D at its mid-portion 3M is greater than the first side tapered portion 3F, the tip section 2, the second end portion 3R and the step portion (d). The greater width of the guide element 3D at the mid-portion 3M provides greater rigidity to the area around the guide hole 3A. The tip section 2, having inner rod 5 inserted within, is interconnectable with the guide element 3D via the inner bore (e). The guide hole 3A is open to the upper side of the rod and is elongated in a lengthwise direction of the rod. A space (c) is defined by the guide hole 3A, the space (c) being open to the underside of the guide element 3D via a drain hole 3E. The passage (a) is open to the space (c) and the guide hole 3A to allow a fishline to extent therethrough.

Referring again to FIG. 3, the guide hole 3A is elongated in the longitudinal direction of the rod and has, generally, a width L that is larger than an inner diameter of bore (b) of the tip section 2. The width of the guide hole 3A allows a fishline more breadth of movement than in conventional rods and severely reduces contact between the line and the rim of the guide hole 3A when the fishline passes through the inner passage (a). Accordingly, even in the event the reel 4 causes the line to oscillate due to the operation of a level winding mechanism on reel 4 and the line comes in contact with the rim of the guide hole 3A, resistance is greatly reduced compared to conventional rod art. However, the width L of the guide hole 3A is much greater than an inner diameter l of the inner rod inner passage (a) at a position near the step portion (d) at the leading portion of the butt section 3. The maximum width L is defined as the width of the guide hole 3A without an attachment ring; such as a ceramic ring, or other rigid ring, which is often used to help more smoothly guide the fishline and is the subject of a patent application, entitled "HOLLOW COLLAPSIBLE FISHING ROD WITH FISHLINE GUIDE" filed on the same day herewith, Dec. 23, 1994, Ser. No. 08/363,078, now U.S. Pat. No. 5,577,338, and is incorporated herein by reference. Similarly, the diameter of the inner passage (a) of the inner rod 5 at the end nearest the butt section 3 is also determined without an attachment such as a grommet.

Figure 5:
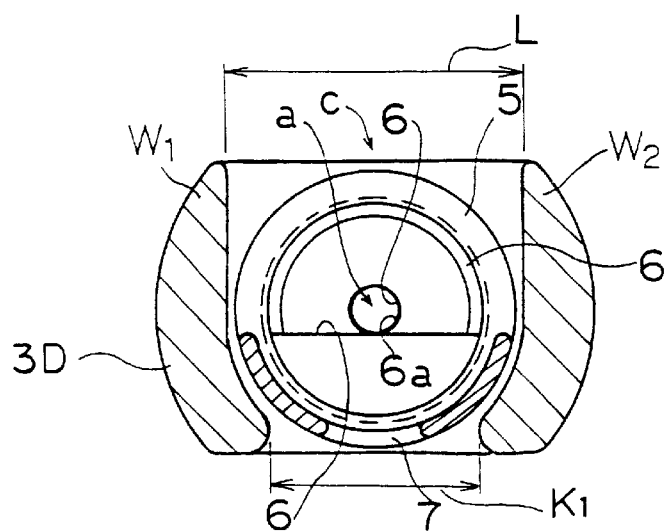
FIG. 5 is an enlarged section of FIG. 3, taken along line V—V, looking in the direction of the arrows.
Figure 6:
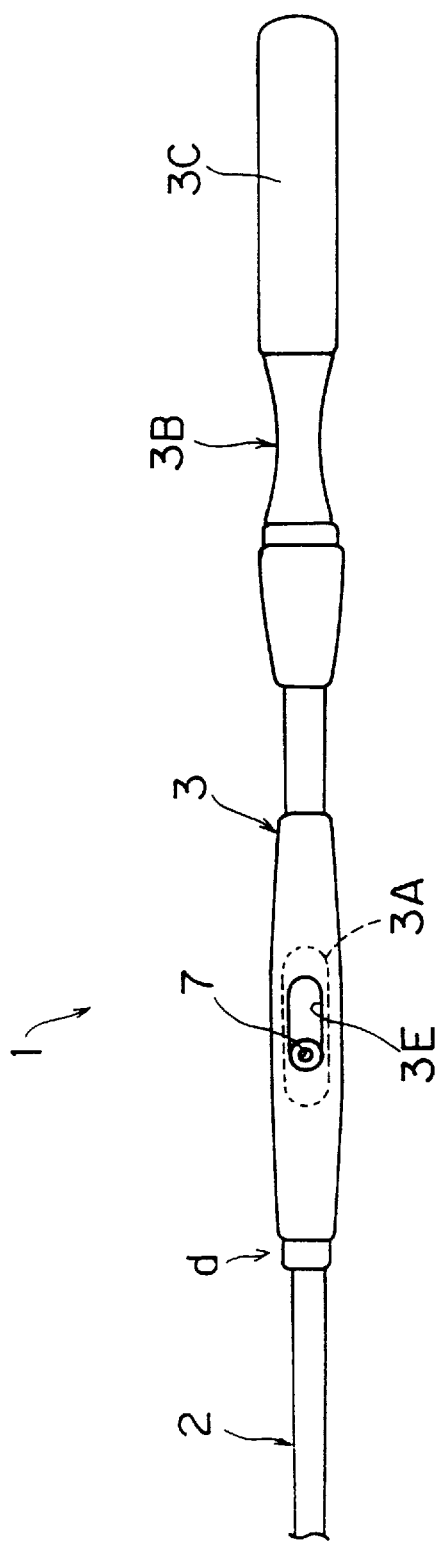
FIG. 6 is a fragmentary bottom view of the rod depicted in FIGS. 1A and 1B.
Figure 7:
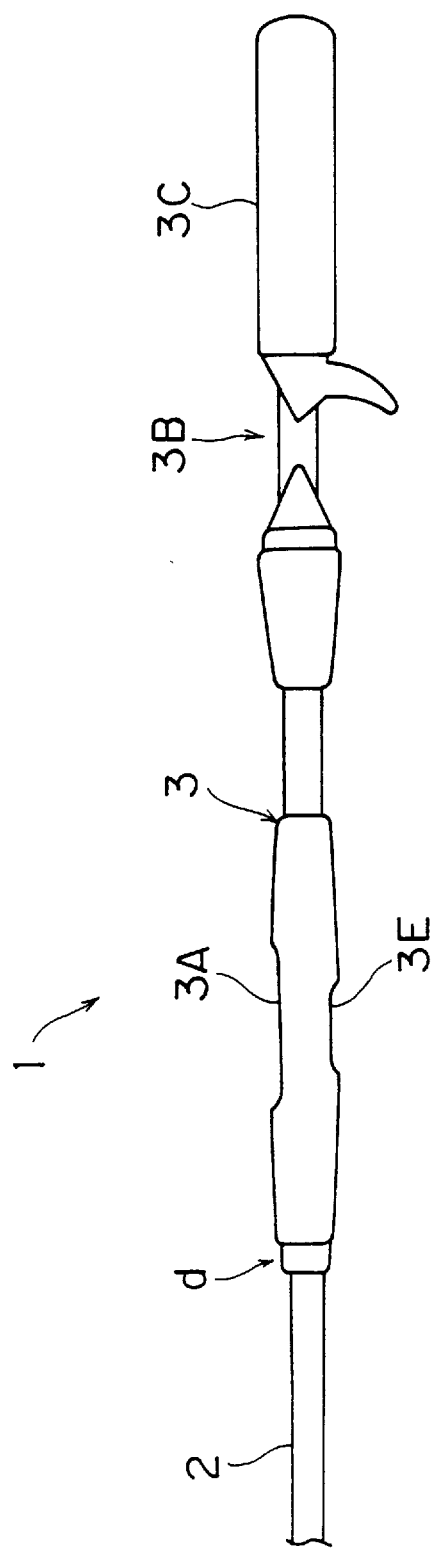
FIG. 7 is a side view of the rod depicted in FIGS. 1A and 1B.

In a bottom wall of the cavity (c) of the guide element 3D, a drain hole 3E penetrating to the outside is formed. The drain hole 3E is positioned opposed to the guide hole 3A, is elliptical in shape elongated in the longitudinal direction, and is smaller in both length and width than the guide hole 3A. A width $K_1$ of the drain hole 3E (see FIG. 5) is larger than a minimum diameter l of the inner passage (a). Thus, dust and other undesirable things entering the inner passage (a) with the line, fall into space (c) and are expelled through the drain hole 3E. As can be seen in FIGS. 3 and 5, the mid-portion 3M includes two side walls $W_1$ and $W_2$.

Figure 2:
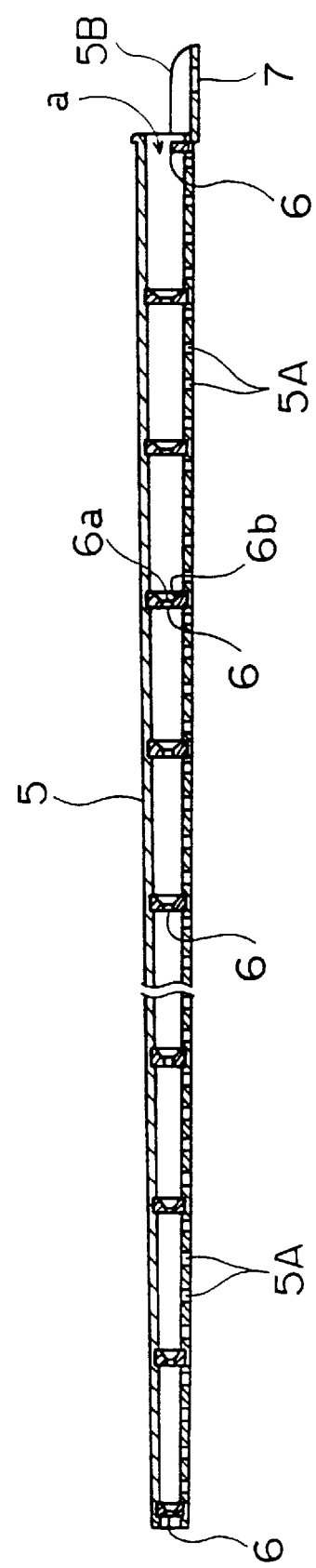
FIG. 2 is a sectional view showing the inner rod of the fishing rod depicted in FIG. 1B, shown on a slightly enlarged scale.

As shown in FIGS. 1 to 4, the inner rod 5 is a tubular elongated element gradually tapered to correspond to the shape of the inside of the tip section 2, and is removable from the tip section 2. The inner passage (a) through which the fishline is to extend is defined throughout the inside the inner rod 5. A plurality of guide elements 6 are placed at intervals over the entire extension of the inner rod 5 in the inner passage (a), as shown in FIG. 2. The guide elements 6 are disk-shaped components each of which is provided with a small diameter guide aperture 6a at its center, and a funnel-like surface 6b facing the second end of the rod. The guide elements 6 may be made of material like cermet, resin or ceramics. Via these guide elements 6, a fishline is supported and guided through the center of the guide aperture 6a and, thereby, the fishline avoids contact with inner wall of the inner rod 5. The inner rod is more fully described in co-pending U.S. patent application Ser. No. 08/363,067 entitled, "AN INNER ROD FOR A HOLLOW COLLAPSIBLE FISHING ROD", assigned to the same assignee as the present application and filed on the same day herewith.

The inner rod 5 has holes 5A formed through the length of the rod which penetrate through the circumferential wall, as shown in FIG. 2. The holes 5A collect dust entering the inner rod and help to make the inner rod 5 flexible. A tab-like section 5B is formed protruding from the second end of the inner rod 5 and is formed with a hole 7 which is for use during assembly and separation In the fishing rod as stated above, the inner rod 5 is inserted and fitted in the tip section 2. When further connected with the butt section 3, tip section 2 is inserted into the inner bore (e) of the butt section 3, and the tab section 5B protrudes fully into the space (c) of the guide element 3D. In this condition, fishline from a reel 4 enters the guide hole 3A, goes through the cavity (c), extends into the inner passage (a) within the inner rod 5. The line is guided through the inner passage (a) and is supported and guided by the guide elements 6 at the apertures 6a, and finally comes out the first end opening 2A of the tip section 2.

In this way, as the fishline is supported by the guide elements 6 within the inner rod 5, the fishline contacts the inner circumferential wall of the inner rod 5 less, and resistance on the fishline is reduced when winding and unwinding the fishline.

Moreover, in this embodiment, since the inner passage (a) is defined in the tip section 2 while the guide hole 3A is formed in the butt section 3, no restriction is imposed on the formation of the guide hole 3A in relation to the tip section 2. Thus, the maximum width of the guide hole 3A can be larger than the diameter of the inner passage (a), and the fishline moved by the level winding mechanism 4 comes in contact less with the rim of the guide hole 3A.

When cleaning the inside of the rod, the inner rod 5 is removed from the tip section 2. This simple action of taking out the inner rod 5 allows for the easy removal of dust deposits and other undesirable things the rod. By inserting an accessory tool in hole 7, removal of the inner rod 5 from the tip section 2 is conveniently facilitated.

Figure 8A:
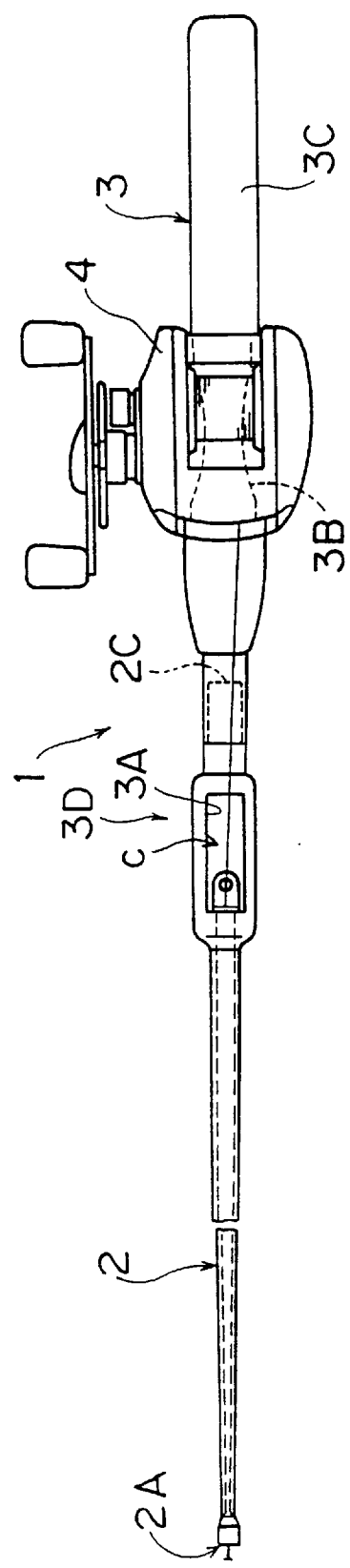
FIG. 8A is a top elevation, similar to FIG. 1A, showing a fishing rod having a guide element portion according to an alternate embodiment of the present invention.
Figure 8B:
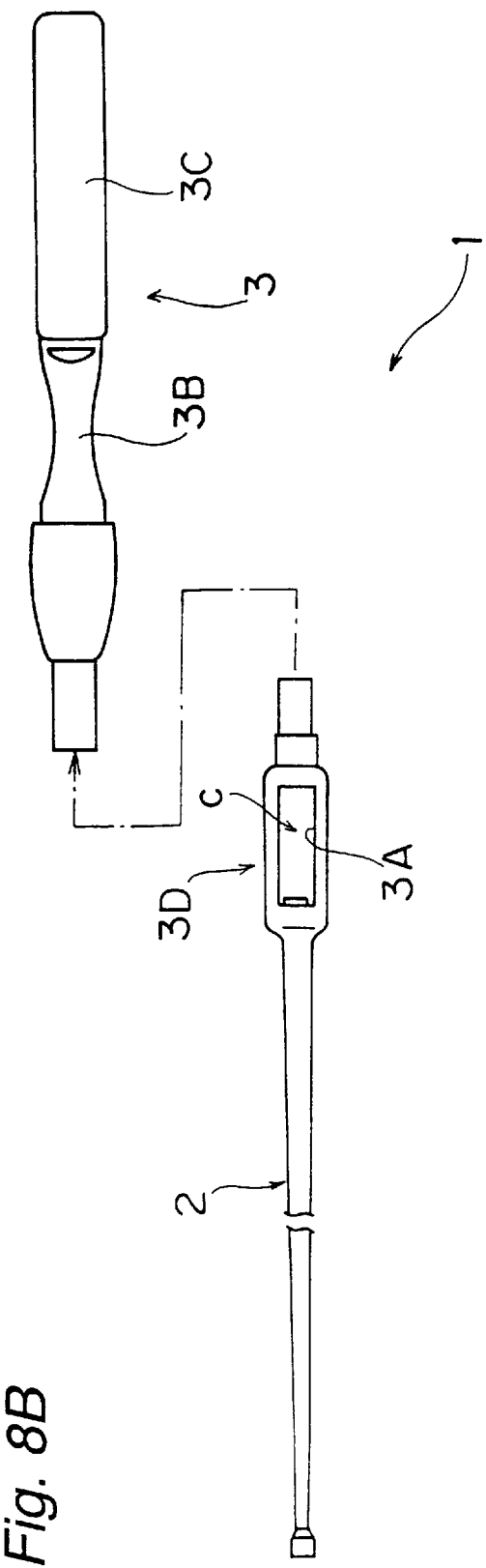
FIG. 8B is an exploded, fragmentary, part elevation of the rod depicted in FIG. 8A, with a part of the rod having a guide element portion shown removed from a butt section of the rod.

In an alternate embodiment, as shown in FIGS. 8A and 8B, the guide element 3D may be formed integrally as a part of the tip section 2.

Figure 9:
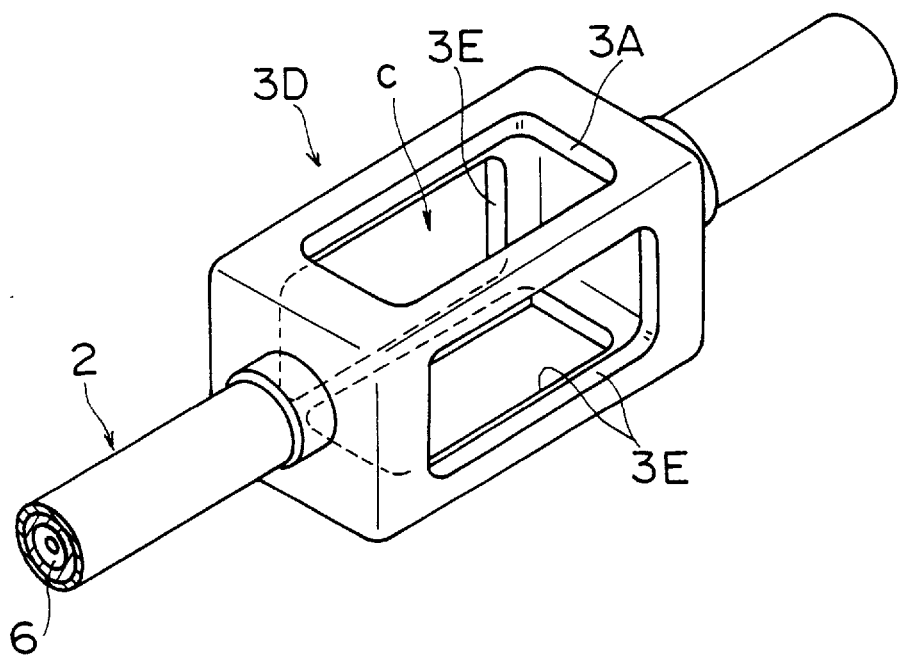
FIG. 9 is a perspective view showing yet another embodiment of a guide element portion of the fishing rod of the present invention.

In yet another embodiment, the drain hole 3E may be the same in shape as the guide hole 3A, as is shown in FIG. 9. Also, as can be seen in FIG. 9, the guide element may have a generally rectangular box shape such that the lateral surfaces of a bottom, top and sides of the guide element 3D may be formed with holes open to a hollow interior (c) to create multiple drain holes.

Figure 10:
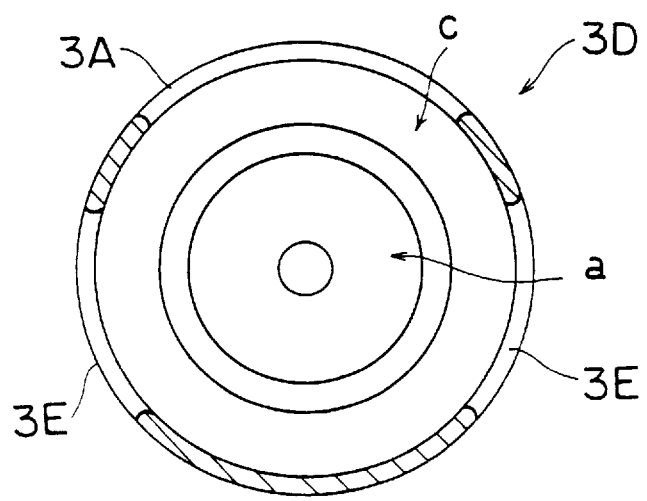
FIG. 10 is a section view of still another embodiment of a guide element portion.

In yet another embodiment, as is shown in FIG. 10, the guide element 3D may be shaped cylindrical in cross section and drain holes 3E may be formed therein; aligned lengthwise with the guide hole 3A but not directly opposite it.

Figure 11:
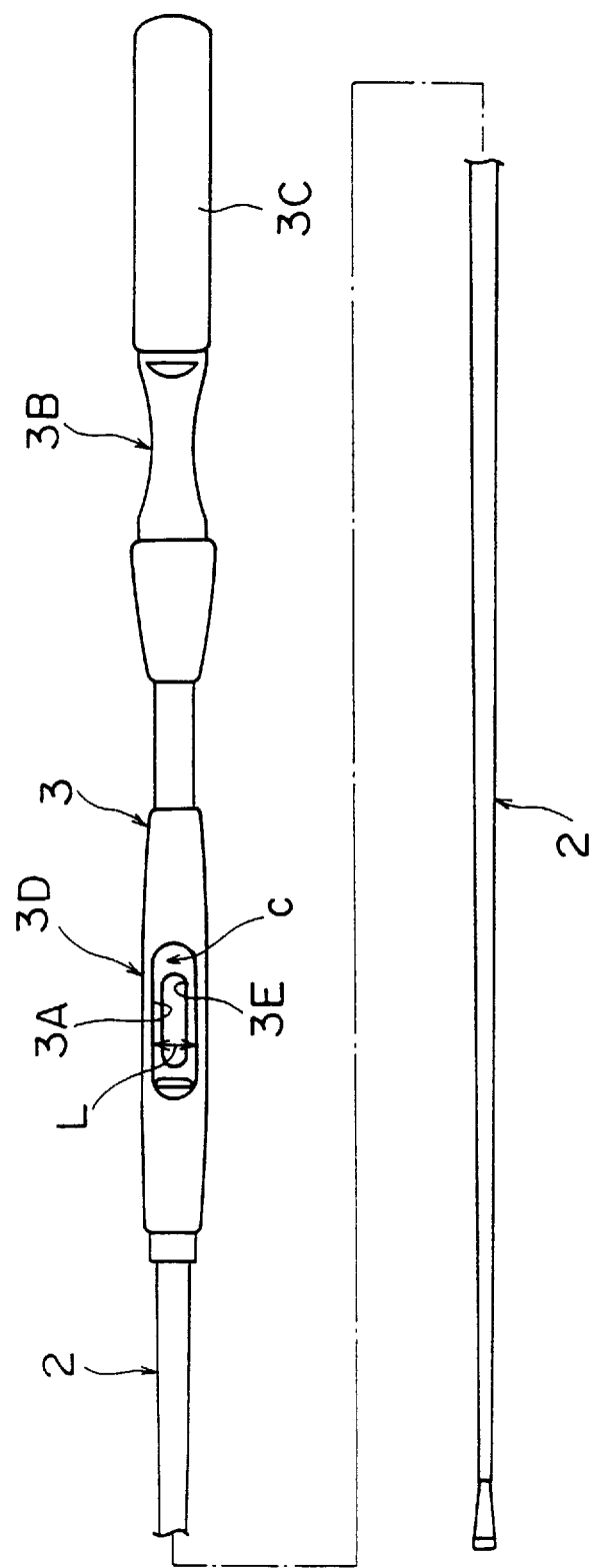
FIG. 11 is an exploded top elevation of a rod having a guide element portion in accordance with another embodiment of the present invention.
Figure 12:
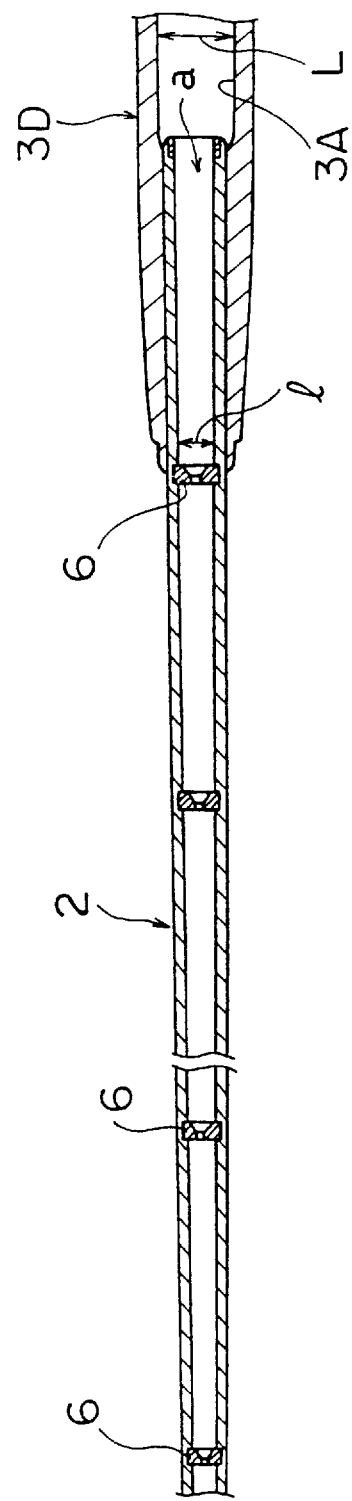
FIG. 12 is a fragmentary section view a portion of the rod depicted in FIG. 11.

In still another embodiment, as shown in FIGS. 11 and 12, the rod includes a tip section 2 and a butt section 3 permanently formed together such that they cannot be separated from each other. In this embodiment, there is no inner rod. Instead, guide rings 6 are directly fitted in an inner passage of the tip section 2. The guide rings 6 may be made of ceramics, metal, resin or the like. The guide elements and other components are similar to those previously mentioned in the above referenced copending application.

Figure 13:
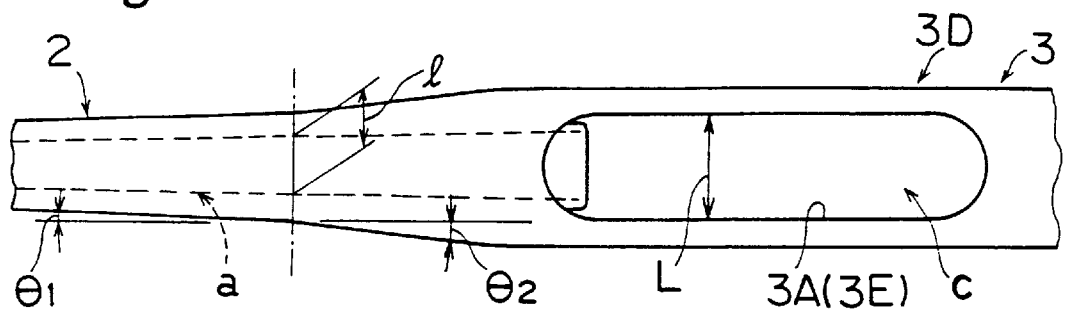
FIGS. 13 through 16 are each top fragmentary elevations, each Fig. showing one of further alternate embodiments of the guide element portion of the fishing rod of the present invention.

In still further embodiments, depicted in FIGS. 13–17, a transit region from the tip section 2 to the butt section 3 may be contiguously flat, without steps, as shown in FIG. 13. Here, the taper angle $\theta_2$ at the first end of the butt section 3 is to be larger than a taper angle $\theta_1$ at the second end of the tip section 2. A width L of the guide hole 3A is to be larger than an inner diameter 1 of the inner passage (a) where the respective sections meet.

Figure 14:
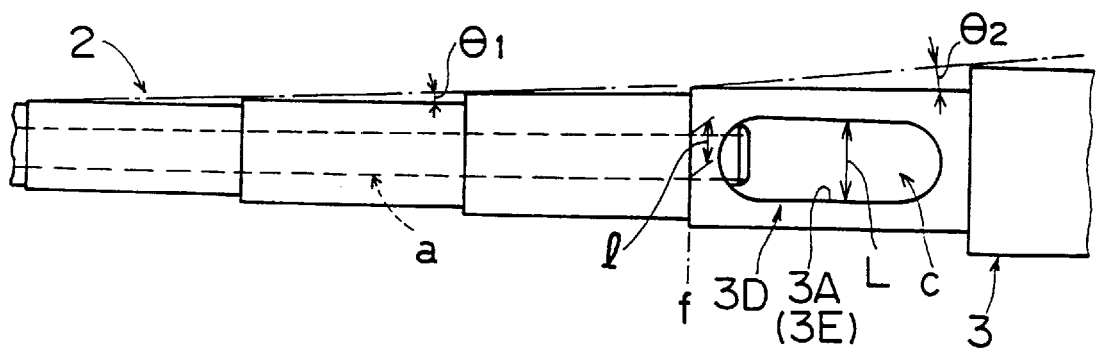
Figure 15:
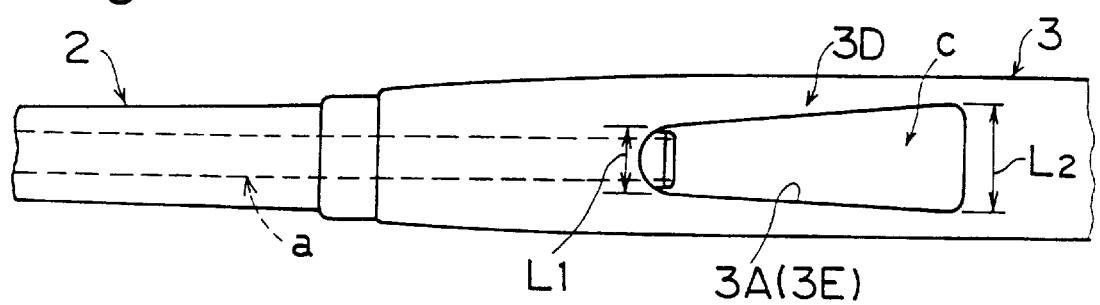
Figure 16:
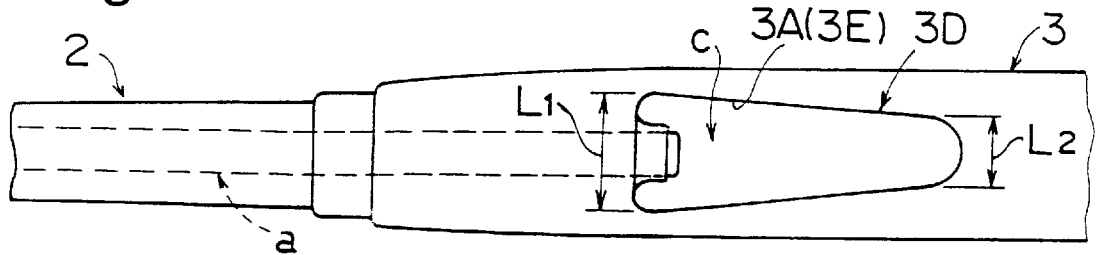

Varied and multiple step sections may be formed in the transition region between the tip section 2 and the butt section 3, as shown in FIG. 14. In the situation where the average taper angle of these step sections, shown in FIG. 14 as $\theta_1$, is the average taper of the rod according to its length; then the butt section average taper angle $\theta_2$, which includes the guide element, is set larger than the tip section average taper angle $\theta_1$. A width L of the guide hole 3A is larger than an inner diameter 1 of the inner passage (a) in a position corresponding to a point (f) where the average taper angle varies.

The guide hole 3A is not restricted to any particular shape previously described in the embodiments. For instance, in an embodiment shown in FIG. 15, a first end width $L_1$ of the guide hole 3D is smaller than a second end width $L_2$. In an alternative embodiment shown in FIG. 16, the width L, is larger than the width $L_2$.

Figure 17:
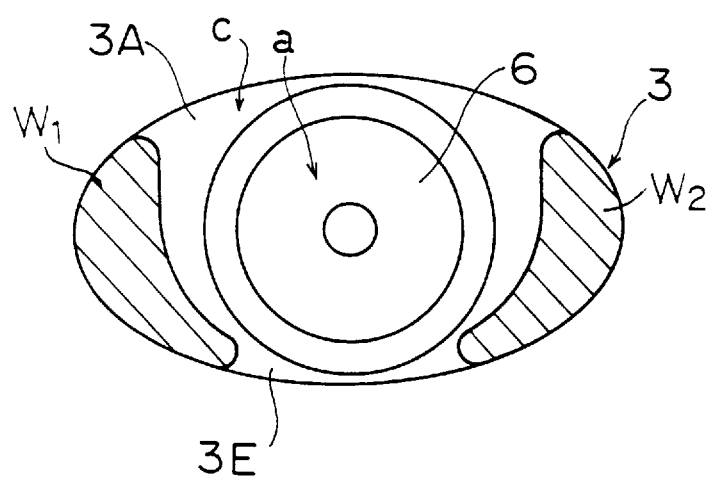
FIG. 17 is a section view showing yet another embodiment of the guide element portion of the fishing rod of the present invention.

The guide element 3D may be shaped elliptical in cross section, as shown in FIG. 17 in yet another embodiment. In such a case, the guide hole 3A may have a larger lateral width.

As can be seen in the various figures and various embodiments, for instance in FIGS. 3, 5, and 17, the mid-section 3M of the guide portion 3D of the butt section 3 is formed with side walls $W_1$ and $W_2$. The side walls $W_1$ and $W_2$ are formed with sufficient width to provide rigidity to the rod 1 in the area around the guide hole 3A to prevent bending in that area. The tip section 2, being tapered, is intentionally designed to bend in accordance with the stresses associated with fishing.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A fishing rod, comprising a butt section having a butt grip and a reel seat;

a guide element connected to said butt section, having a guide hole formed in a mid-portion thereof defining a cavity and an inner bore opening extending from said cavity to a first end thereof;

at least one drain hole formed in a region of said guide element generally opposite said guide hole, said drain hole open to said cavity; and a tip section connected to said first end of said guide element, having an inner passage extending therethrough open to said inner bore;

wherein said guide hole has a width larger than the inner diameter of said inner passage, and a fishing line is extendable from said guide hole through said inner passage.

2. A fishing rod according to claim 1 wherein said tip section tapers from a second end connected to said guide element down to a first end;

said guide element has first and second end portions which taper down to the ends of said guide element; and the taper angles of said end portions of said guide element are larger than the taper angle of said tip section.

3. A fishing rod according to claim 2, further comprising a step element disposed between said tip section and said guide element, having a diameter larger than the largest outer diameter of said tip section and smaller than the outer width of the guide element.

4. A fishing rod according to claim 1, wherein said tip section and said butt section can be removably attached to each other.

5. A fishing rod according to claim 2, wherein a transition region between said second end of said tip section and a first end of a rear rod portion that includes a butt section and a guide element is shaped in a series of stepped rod portions gradually decreasing in outer diameter toward said second end of said tip section; and the tip section has an average taper angle smaller than an average taper angle of said rear rod portion.

6. A fishing rod according to claim 1, wherein said guide hole is elongated in a longitudinal direction of said rod.

7. A fishing rod according to claim 1, wherein a first end of said guide hole is smaller than its other end.

8. A fishing rod according to claim 1, wherein a first end of said guide hole is larger than its other end.

9. A fishing rod according to claim 1, wherein a lateral cross section of said guide element is shaped elliptically.

10. A fishing rod according to claim 1, wherein the the width of said guide hole is larger than the diameter of said inner passage.

11. A fishing rod, comprising a butt section having a butt grip and a reel seat;

a guide element connected to said butt section, having an inner bore opening at a first end thereof, a guide hole section formed with a hole penetrating through an outer wall open to said inner bore, and at least one drain hole formed in a region of said guide element generally opposite said guide hole, said drain hole open to said cavity; and a tubular tip section connected to said guide element, having an inner passage extending through a longitudinal center thereof open at both a first end and a second end and open to said guide element inner bore;

wherein said guide hole has a width larger than an inner diameter of said inner passage, and said drain hole has a larger diameter than a minimum diameter of said inner passage of said tip section.

12. A fishing rod according to claim 11, wherein the inner bore of said guide element extends between said guide hole and said drain hole.

13. A fishing rod according to claim 11, wherein said drain hole is elongated in a longitudinal direction of the rod.

14. A fishing rod according to claim 11, wherein said drain hole is shaped generally the same as said guide hole.

15. A fishing rod, comprising a butt section having a butt grip and a reel seat;

a guide element connected to said butt section, having a guide hole formed in a mid-portion thereof which defines a cavity therein, and an inner bore open to said cavity and extending from said cavity to a first end thereof, and a tip section having a first end and a second end, said second end of said tip section being directly connected to said first end of said guide element, said tip section having an inner passage extending therethrough open to said inner bore;

wherein the diameter of said inner passage proximate to said second end of said tip section is greater than the diameter of said inner passage proximate to said first end of said tip section; and said guide hole has a width larger than said inner diameter of said inner passage proximate to said second end of said tip section, with a fishing line being extendable from said guide hole through said inner passage.

* * * * *